(12) United States Patent
Pimpinella (10) Patent No.: US 9,720,187 B2
(45) Date of Patent: Aug. 1, 2017

(54) DIRECT ATTACHED PLUGGABLE MODULE WITH A CABLE ATTACHMENT AND ACTUATION SUB-ASSEMBLY

(71) Applicant: Panduit Corp., Tinley Park, IL (US)

(72) Inventor: Richard J. Pimpinella, Frankfort, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 14/820,840

(22) Filed: Aug. 7, 2015

(65) Prior Publication Data

US 2016/0041349 A1 Feb. 11, 2016

Related U.S. Application Data

(60) Provisional application No. 62/035,059, filed on Aug. 8, 2014.

(51) Int. Cl.
*G02B 6/38* (2006.01)
*G02B 6/42* (2006.01)

(52) U.S. Cl.
CPC ......... *G02B 6/3893* (2013.01); *G02B 6/3887* (2013.01); *G02B 6/4284* (2013.01); *G02B 6/4249* (2013.01)

(58) Field of Classification Search
None
See application file for complete search history.

(56) References Cited

U.S. PATENT DOCUMENTS

| | | |
|---|---|---|
| 5,580,268 A | 12/1996 | Miyazawa |
| 6,099,339 A | 8/2000 | Yanagida et al. |
| 6,165,006 A | 12/2000 | Yeh et al. |
| 6,434,015 B1 | 8/2002 | Hwang |
| 7,008,253 B2 | 3/2006 | Szczesny |
| 7,090,525 B1 | 8/2006 | Morana |
| 7,357,582 B2 | 4/2008 | Oki et al. |
| 7,466,544 B2 | 12/2008 | Hardt et al. |
| 7,513,698 B2 | 4/2009 | Andersson |
| 7,699,641 B2 | 4/2010 | Bright et al. |
| 8,113,723 B2 | 2/2012 | Togami et al. |
| 9,081,156 B2 | 7/2015 | Togami et al. |
| 2009/0246999 A1 | 10/2009 | Crofoot et al. |

*Primary Examiner* — Jerry Rahll
(74) *Attorney, Agent, or Firm* — Christopher S. Clancy; James H. Williams; Christopher K. Marlow (57) ABSTRACT

A direct attached pluggable module with a cable attachment and actuation sub-assembly is described. The cable attachment and actuation sub-assembly can have a boot, crimp sleeve, core housing, actuator inner-housing, pull-grip, and springs. The cable attachment actuation and sub-assembly can combines the functions of cable retention, bend radius control and actuation into a single sub-assembly.

8 Claims, 10 Drawing Sheets

DIRECT ATTACHED PLUGGABLE MODULE WITH A CABLE ATTACHMENT AND ACTUATION SUB-ASSEMBLY

CROSS-REFERENCE TO RELATED APPLICATIONS

This application claims priority to U.S. Provisional Application No. 62/035,059, filed Aug. 8, 2014, the subject matter of which is hereby incorporated by reference in its entirety.

FIELD OF THE INVENTION

The present invention relates generally to direct attached pluggable modules and more specifically, to an improved apparatus and method for implementing cable retention, bend radius control, and module removal actuation in such modules.

BACKGROUND OF THE INVENTION

Higher speed digital communication links operating at 40 Gbps and 100 Gbps employ transceivers that transmit 10 Gbps serial data over 4 or 10 parallel lanes to achieve the 40 Gbps or 100 Gbps aggregate data rates, respectively. Modular transceivers and direct attached pluggable module assemblies that support 40 Gbps transmission are currently packaged in Quad Small Formfactor Pluggable (QSFP+) modules as specified in MSA (Multiple Source Agreement) document INF-8438 and Industry Ad hoc group document SFF-8436.

Figure 1:
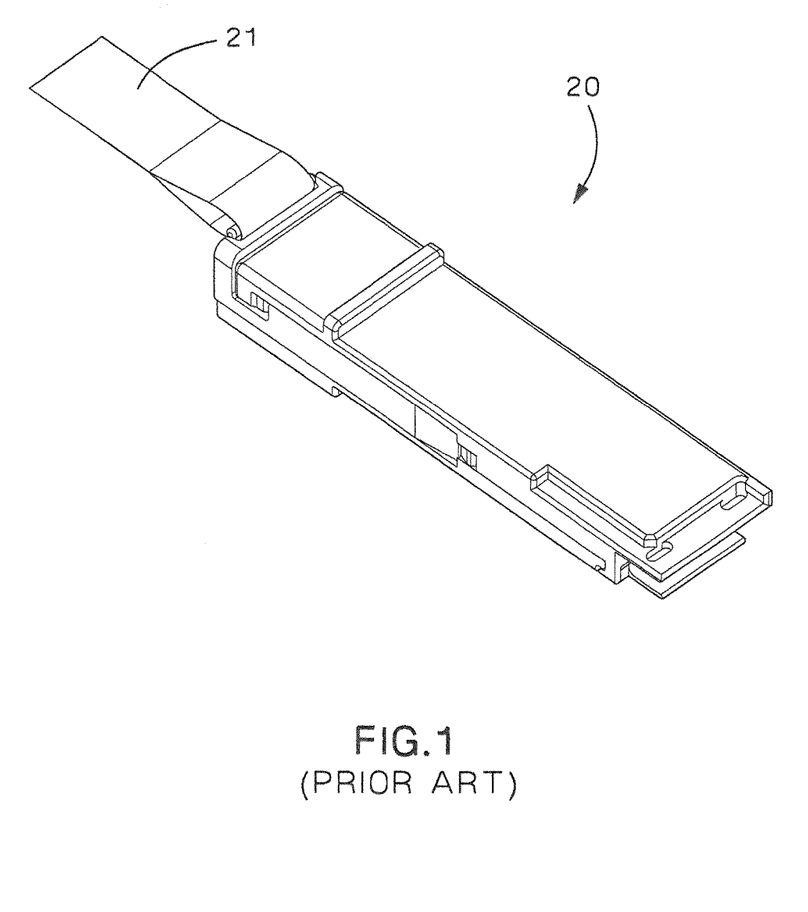
FIGS. 1 and 2 are perspective views of prior art embodiments of actuation mechanisms for QSFP+ and direct attached pluggable modules.
Figure 2:
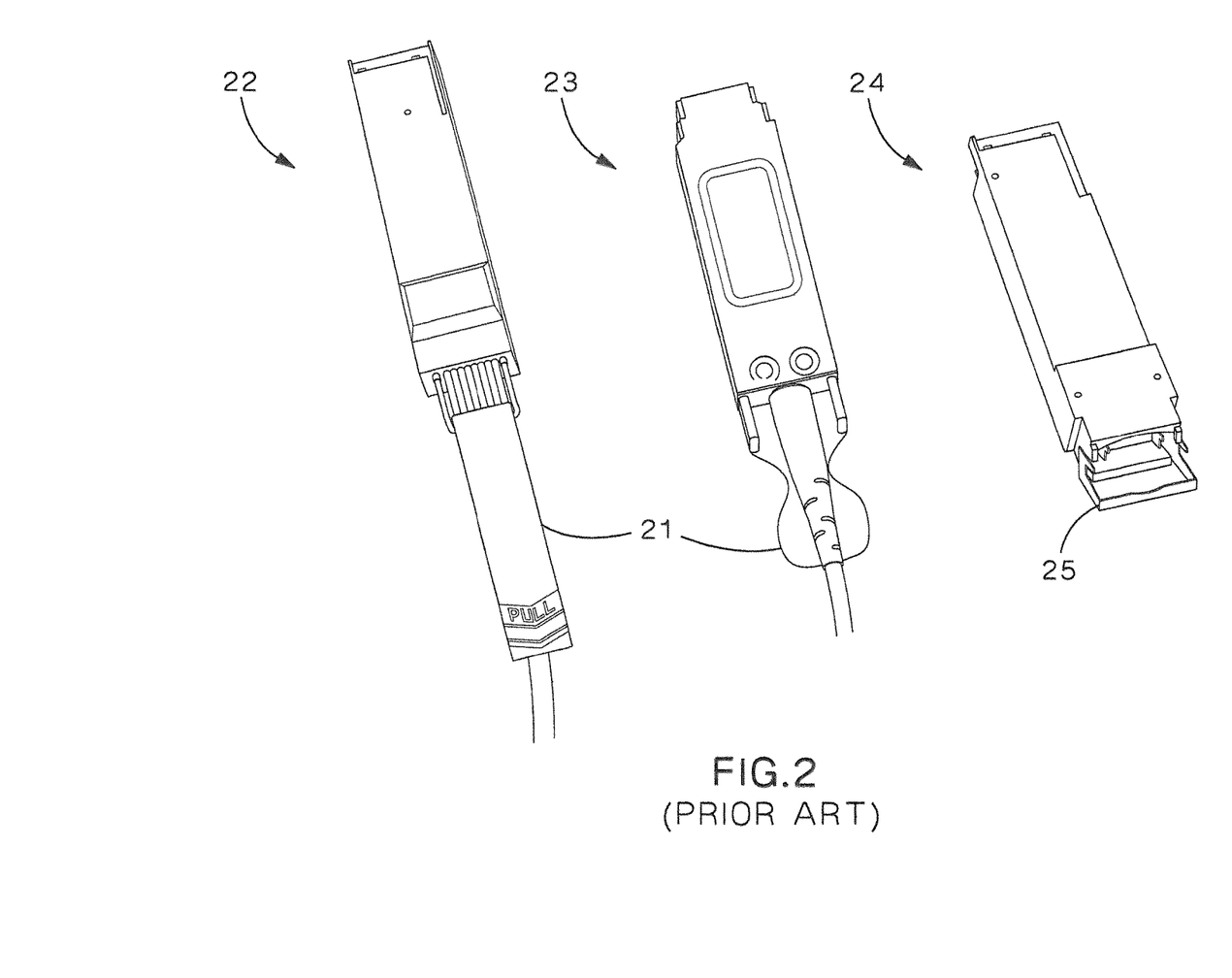

These types of modules must have a means to self-lock when inserted into a host enclosure module cage and must also allow insertion and extraction without the use of special tools. Hence, the QSFP+ modules and direct attached pluggable cable assemblies employ a latching mechanism that facilitates convenient module insertion and removal. Currently, the standard actuation method for removing the module from the host cage assembly is to use a bail type actuator as illustrated in U.S. Pat. No. 7,445,485 (see FIG. 1, showing a prior art module 20). Pulling the bail tab 21 causes a metal spring finger to slide outward disengaging the latching mechanism. Examples of two other prior art modules 22, 23 with typical pull tabs 21 and a prior art module 24 with a transceiver release bail 25 are shown in FIG. 2. Although the actuation method for these direct attached pluggable module assemblies is effective, a mechanism with fewer components and improved ergonomic design is desirable.

Figure 3:
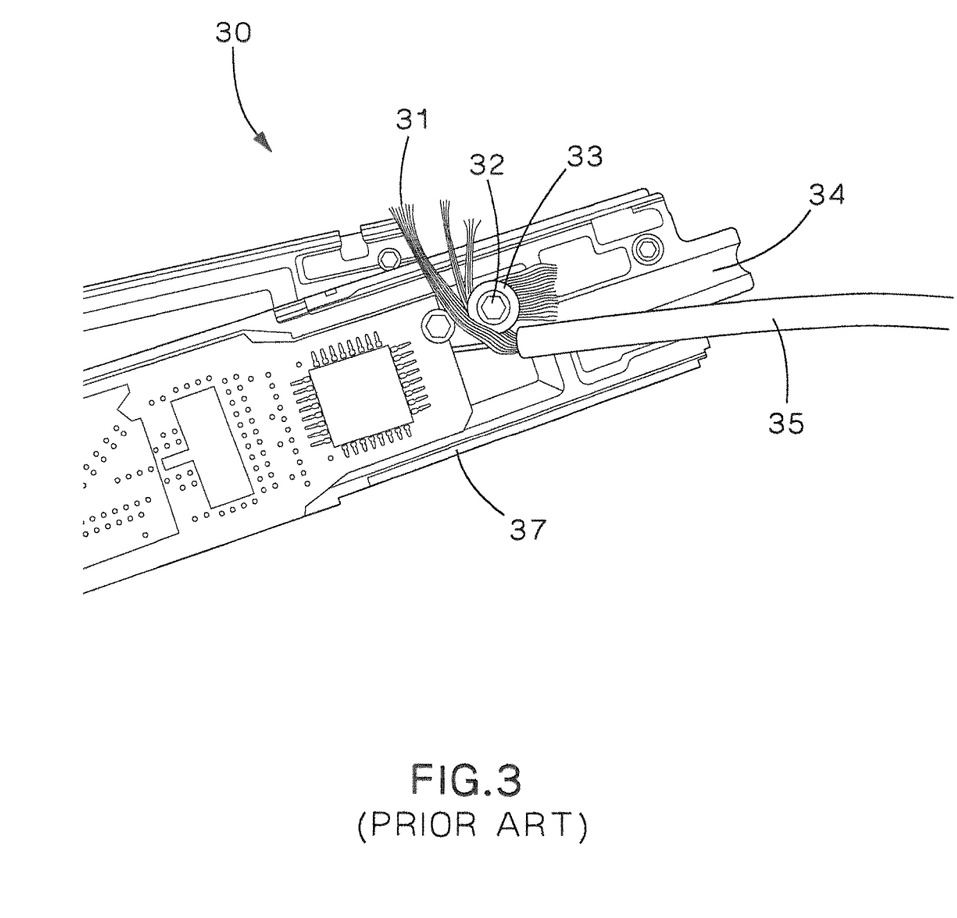
FIG. 3 is a perspective view showing a prior art method of cable retention for a pluggable module.

In addition, direct attached pluggable modules have no standard method for managing cable retention. For example, as shown in FIG. 3, in one direct attach optical module 30, cable retention is achieved by clamping the aramid yarn 31 of the cable 35 to the module housing 37 using a screw 32 and washer 33. Once attached, the cable 35 is placed in a cylindrical channel 34 which extends beyond the housing wall forming a cable inlet in order to provide a means for attaching a rubber boot for bend radius control.

Figure 4:
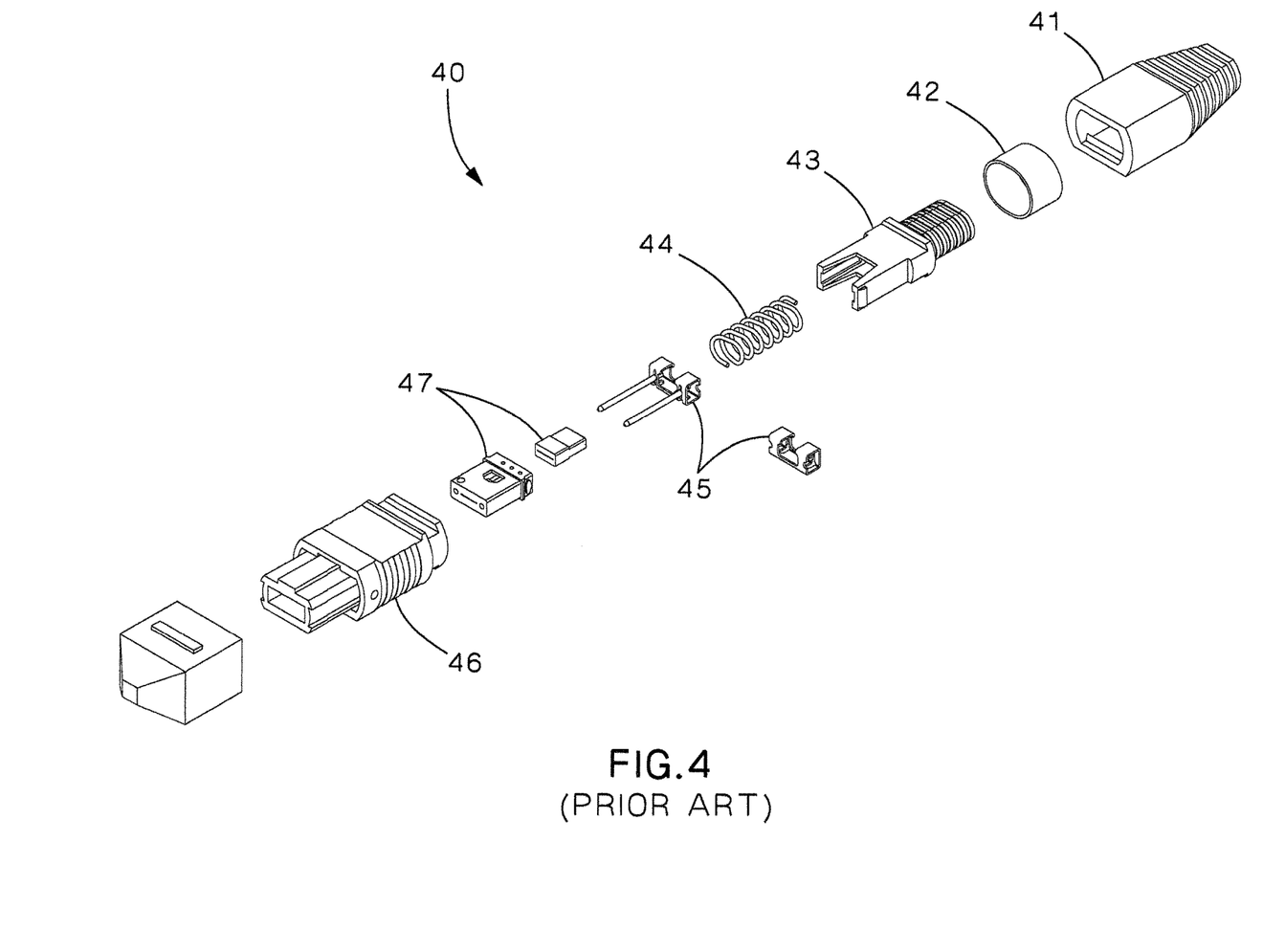
FIG. 4 is an exploded perspective view of an MPO type connector.

FIG. 4, shows an exploded view of a typical MPO connector 40. The MPO connector 40 has a boot 41, crimp sleeve 42, core housing 43, spring 44, alignment pins 45, ferrule 47, and MPO housing 46. MPO connectors such as the one shown in FIG. 4, are able to implement bend radius control, cable retention, and an ergonomic actuation in a single assembly which until now, has not been implemented for direct attached pluggable modules. As a result, it is desirable to modify the design of a direct attached pluggable module in order to take advantage of the desirable elements of an MPO-style connector.

SUMMARY OF THE INVENTION

This application describes a direct attached pluggable module with a cable attachment and actuation sub-assembly. The cable attachment and actuation sub-assembly can have a boot, crimp sleeve, core housing, actuator inner-housing, pull-grip, and springs. The cable attachment actuation and sub-assembly combines the functions of cable retention, bend radius control and actuation into a single sub-assembly.

DETAILED DESCRIPTION OF THE PREFERRED EMBODIMENTS

Figure 5:
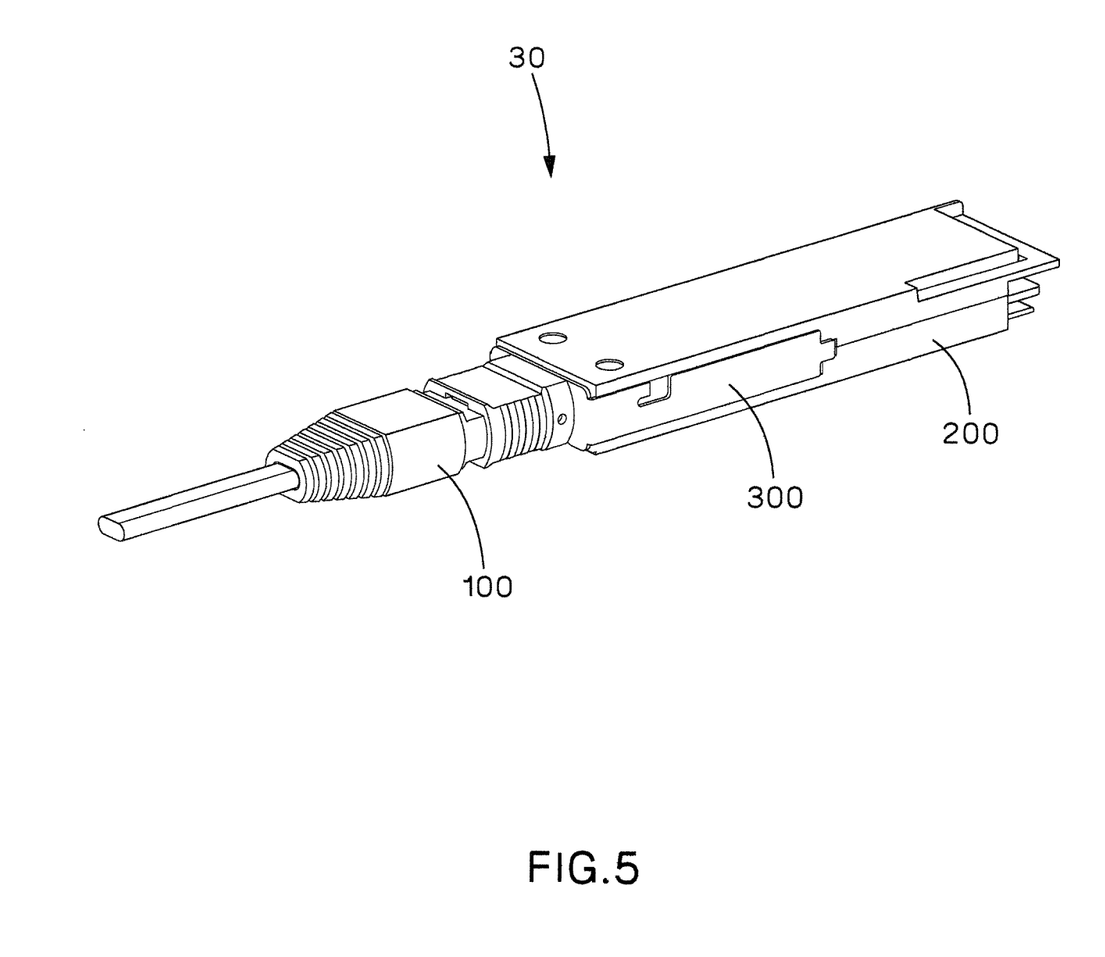
FIG. 5 is a perspective view of one embodiment of a direct attached pluggable module with a cable attachment and actuation sub-assembly.

FIG. 5 shows one embodiment of a direct attached pluggable module 10 with improved cable retention and removal actuation. The direct attached pluggable module 10 has a cable attachment and actuation sub assembly 100, spring fingers 300, a printed circuit board 400 (not shown in FIG. 5, but shown in FIG. 9), and a module housing 200.

Figure 6:
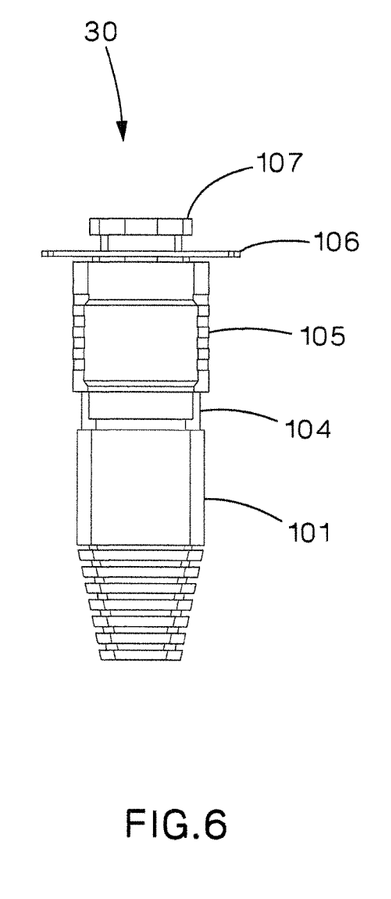
FIG. 6 is a top view of the cable attachment and actuation sub-assembly of the direct attached pluggable module of FIG. 6.
Figure 7A:
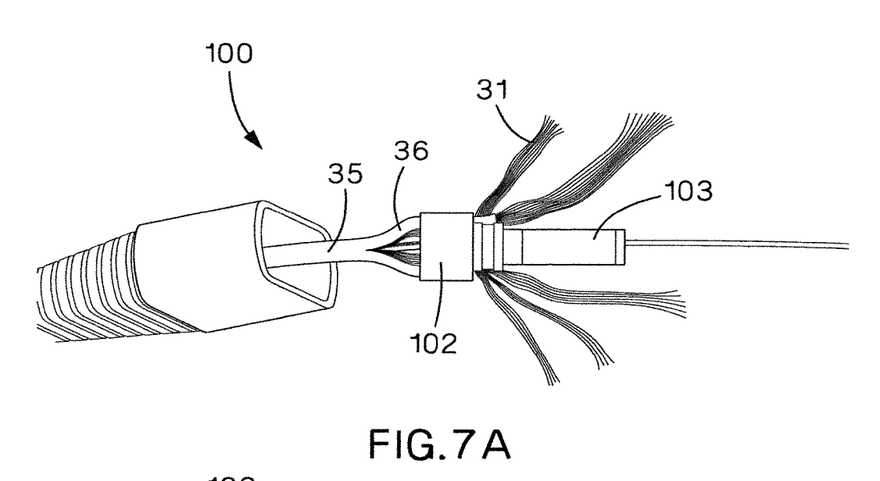
FIGS. 7A-C are perspective views of a cable being retained to the cable attachment and actuation sub-assembly by having the cable jacket and aramid yarn secured between a crimp sleeve and a core housing.
Figure 7B:
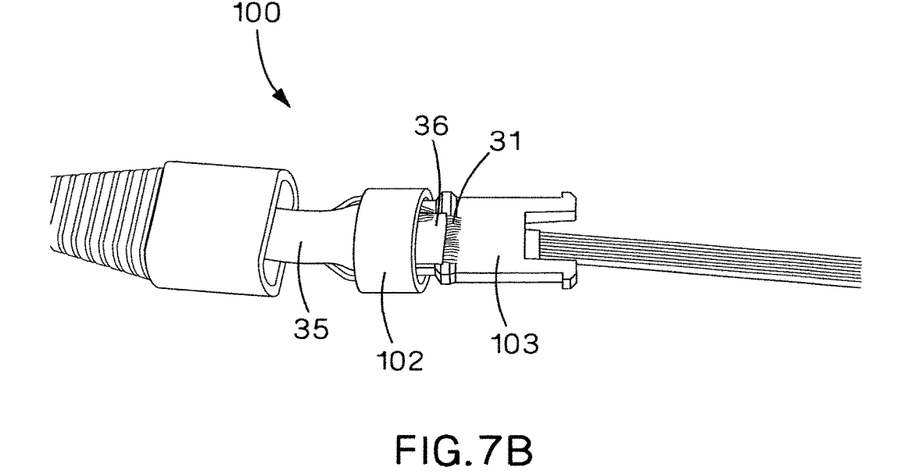
Figure 7C:
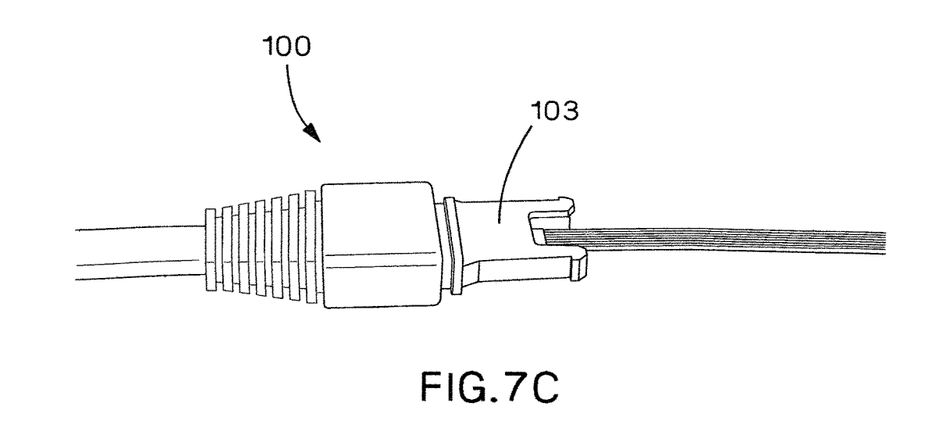
Figure 8:
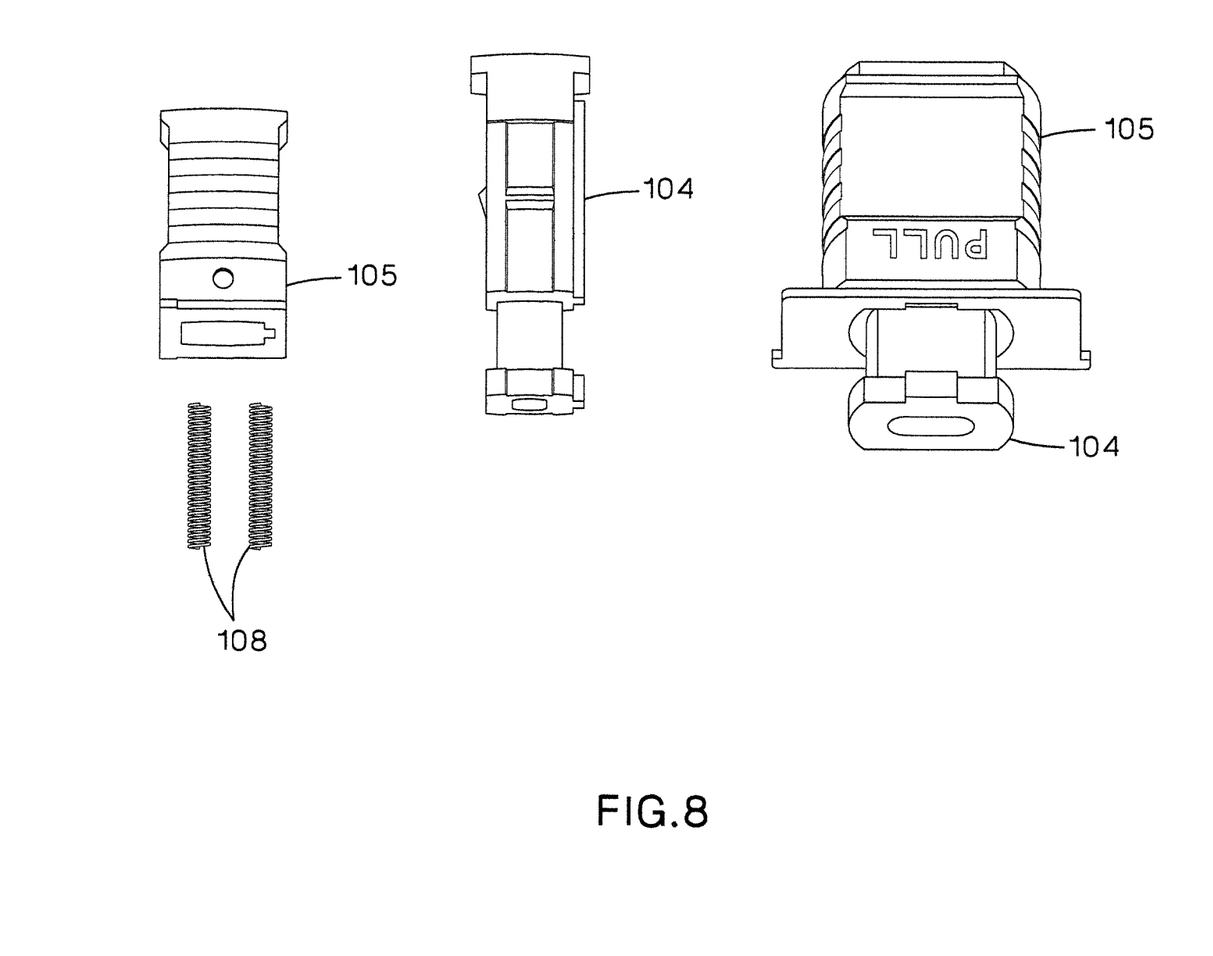
FIG. 8 consists of perspective views of the actuator inner-housing, springs, and pull-grip of the cable attachment and actuation sub-assembly of FIG. 6.

As shown in FIGS. 6-8, the cable attachment and actuation sub-assembly 100 has a boot 101, crimp sleeve 102, core housing 103, actuator inner housing 104, pull-grip 105, and springs 108.

FIGS. 7A-C show that cable retention to the cable attachment and actuation sub-assembly 100 is accomplished by having a small section of the cable jacketing 36 and strength member 31 such as aramid yarn secured between the core housing 103 and the crimp sleeve 102. Then the crimp sleeve 102 can be crimped and the excess strength member 31 trimmed.

The actuator inner-housing 104 then slides over the core housing 103 and snaps into place and then the pull-grip 105 slides over the actuator inner housing. The pull-grip 105 is free to slide along a portion of the actuator inner-housing 104 and is biased forward by the springs 108 which are assembled into pull-grip 105.

Figure 9:
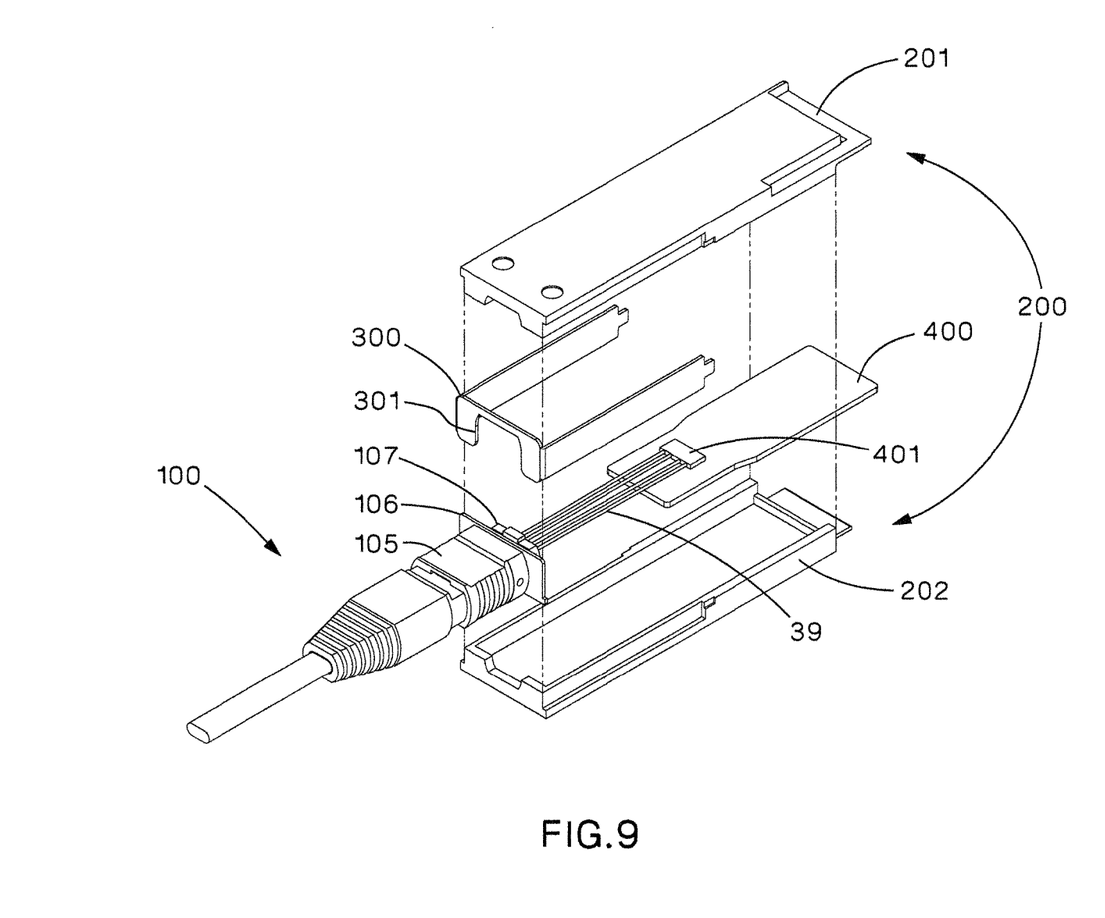
FIG. 9 is a partially-exploded perspective view showing one embodiment of how the pull grip of the cable attachment and actuation sub-assembly can interact with the spring fingers.
Figure 10:
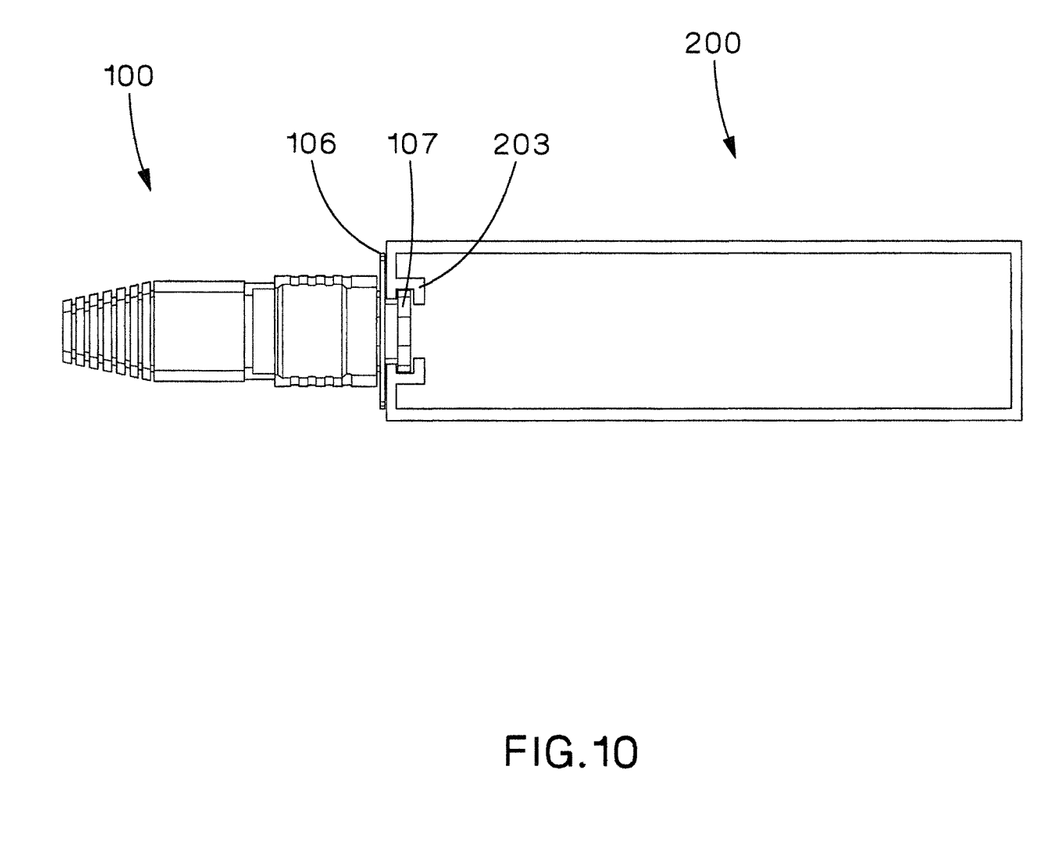
FIG. 10 is cross-sectional view showing one embodiment of how the cable attachment and actuation sub-assembly can be attached to the module housing.

FIGS. 9 and 10 show how the cable attachment and actuation sub-assembly 100 is attached to the spring finger latching mechanism 300 and the module housing 200. In one embodiment, as seen best in FIG. 9, a u-shaped cutout 301 can engage a flange feature 106 located on the end of the pull grip 105. This causes the spring finger mechanism 300 to retract in lockstep with the pull-grip 105. Alternatively, the spring finger 300 can be over-molded in the pull grip 105.

The module housing 200 can be secured to the actuator inner housing 104 via a flange 107 on the actuator inner housing 104 engaging a receiving feature located 203 on one or more of the module housing halves 201, 202.

In order to complete the assembly for the pluggable module 10, the printed circuit board 400 can be secured to one of the module housing halves 201, 201; the fiber elements 39 of the cable 35 can be attached to optical elements 401 on the printed circuit board 400; and the two housing halves 201, 202 can be secured together.

While particular embodiments and applications of the present invention have been illustrated and described, it is to be understood that the invention is not limited to the precise construction and compositions disclosed herein and that various modifications, changes, and variations may be apparent from the foregoing without departing from the spirit and scope of the invention as described.

What is claimed:

1. A pluggable module comprising:
    a fiber optic cable, the fiber optic cable including at least one optical fiber and at least one strength member;
    a core housing, the at least one optical fiber passing through the core housing;
    an inner housing enclosing and secured to the core housing;
    a pull grip surrounding the inner housing and configured to be able to freely slide along a portion of the inner housing;
    spring fingers secured to the pull grip; and
    a module housing secured to the inner housing, the module housing being secured to the inner housing via a flange on the inner housing engaging a receiving feature on the module housing.

2. The pluggable module of claim 1 further comprising a crimp sleeve and wherein the at least one strength member is secured between the core housing and the crimp sleeve.

3. The pluggable module of claim 2 wherein the at least one strength member is aramid yarn.

4. The pluggable module of claim 2 further comprising a printed circuit board enclosed within the module housing, the at least one optical fiber being connected to at least one optical component on the printed circuit board.

5. The pluggable module of claim 4 further comprising a boot enclosing the crimp ring and a portion of the core housing.

6. The pluggable module of claim 1 wherein the spring fingers are secured to the pull grip via a u-shaped cut-out on the spring fingers engaging a flange feature on the pull grip.

7. The pluggable module of claim 1 wherein the spring fingers are over-molded in the pull-grip.

8. The pluggable module of claim 1 further comprising springs retained within the pull-grip configured to bias the pull grip in a forward position.

* * * * *